United States Patent
Arora

(10) Patent No.: US 10,331,578 B2
(45) Date of Patent: Jun. 25, 2019

(54) FINE-GRAINED ACCESS HOST CONTROLLER FOR MANAGED FLASH MEMORY

(71) Applicant: Intel Corporation, Santa Clara, CA (US)

(72) Inventor: Divya Arora, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 15/618,692

(22) Filed: Jun. 9, 2017

(65) Prior Publication Data

US 2018/0357184 A1 Dec. 13, 2018

(51) Int. Cl.
| | | |
|---|---|---|
| *G06F 12/00* | (2006.01) | |
| *G06F 13/00* | (2006.01) | |
| *G06F 12/14* | (2006.01) | |
| *G11C 7/22* | (2006.01) | |

(52) U.S. Cl.
CPC ...... *G06F 12/1483* (2013.01); *G06F 12/1441* (2013.01); *G11C 7/22* (2013.01)

(58) Field of Classification Search
None
See application file for complete search history.

(56) References Cited

U.S. PATENT DOCUMENTS

| | | | | |
|---|---|---|---|---|
| 7,774,556 B2* | 8/2010 | Karamcheti | .......... | G06F 9/5016 711/146 |
| 7,970,983 B2* | 6/2011 | Nochimowski | ..... | G06F 12/0246 710/8 |
| 8,959,576 B2* | 2/2015 | Sastry | ..................... | G06F 21/57 726/1 |
| 9,740,637 B2* | 8/2017 | Chen | ................... | G06F 12/1408 |
| 9,842,065 B2* | 12/2017 | Banginwar | ........... | G06F 12/145 |
| 9,910,611 B2* | 3/2018 | Koufaty | ................ | G06F 3/0622 |
| 9,990,237 B2* | 6/2018 | Tsirkin | ..................... | G06F 9/526 |
| 10,191,861 B1* | 1/2019 | Steinberg | ............. | G06F 12/1491 |
| 2008/0046997 A1* | 2/2008 | Wang | ..................... | G06F 21/79 726/16 |
| 2009/0100215 A1* | 4/2009 | Nochimowski | ..... | G06F 12/0246 711/103 |
| 2014/0068158 A1* | 3/2014 | Cheng | ................. | G06F 12/0246 711/103 |
| 2014/0250290 A1* | 9/2014 | Stahl | ..................... | G06F 21/575 713/2 |

* cited by examiner

*Primary Examiner* — Sean D Rossiter
(74) *Attorney, Agent, or Firm* — Jordan IP Law, LLC

(57) ABSTRACT

An embodiment of a memory apparatus may include a managed flash controller to control a managed flash device, and a flash access restriction enforcer communicatively coupled to the managed flash controller to enforce access controls on read and write transactions to the managed flash device. Other embodiments are disclosed and claimed.

24 Claims, 6 Drawing Sheets

FINE-GRAINED ACCESS HOST CONTROLLER FOR MANAGED FLASH MEMORY

TECHNICAL FIELD

Embodiments generally relate to memory systems. More particularly, embodiments relate to fine-grained access host controller for managed flash memory.

BACKGROUND

Some electronic devices may use storage media such as an embedded multi-media card (eMMC) device (e.g., compatible with JEDEC standard JESD84-B51, version 5.1, released February 2015) or a universal flash storage (UFS) device (e.g., compatible with JEDEC standard JESD220B, version 2.0, released September 2013).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. Non-limiting examples of nonvolatile memory may include any or a combination of: solid state memory (such as planar or three dimensional (3D) NAND flash memory or NOR flash memory), 3D cross point memory, storage devices that use chalcogenide phase change material (e.g., chalcogenide glass), a byte-addressable three dimensional crosspoint memory, other byte addressable write-in-place nonvolatile memory devices, such as single or multi-level Phase Change Memory (PCM), PCM with Switch (PCMS), ferroelectric memory, silicon-oxide-nitride-oxide-silicon (SONOS) memory, polymer memory (e.g., ferroelectric polymer memory), ferroelectric transistor random access memory (Fe-TRAM), magnetoresistive random access memory (MRAM) memory that incorporates memristor technology, spin transfer torque (STT)-MRAM, ovonic memory, resistive memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
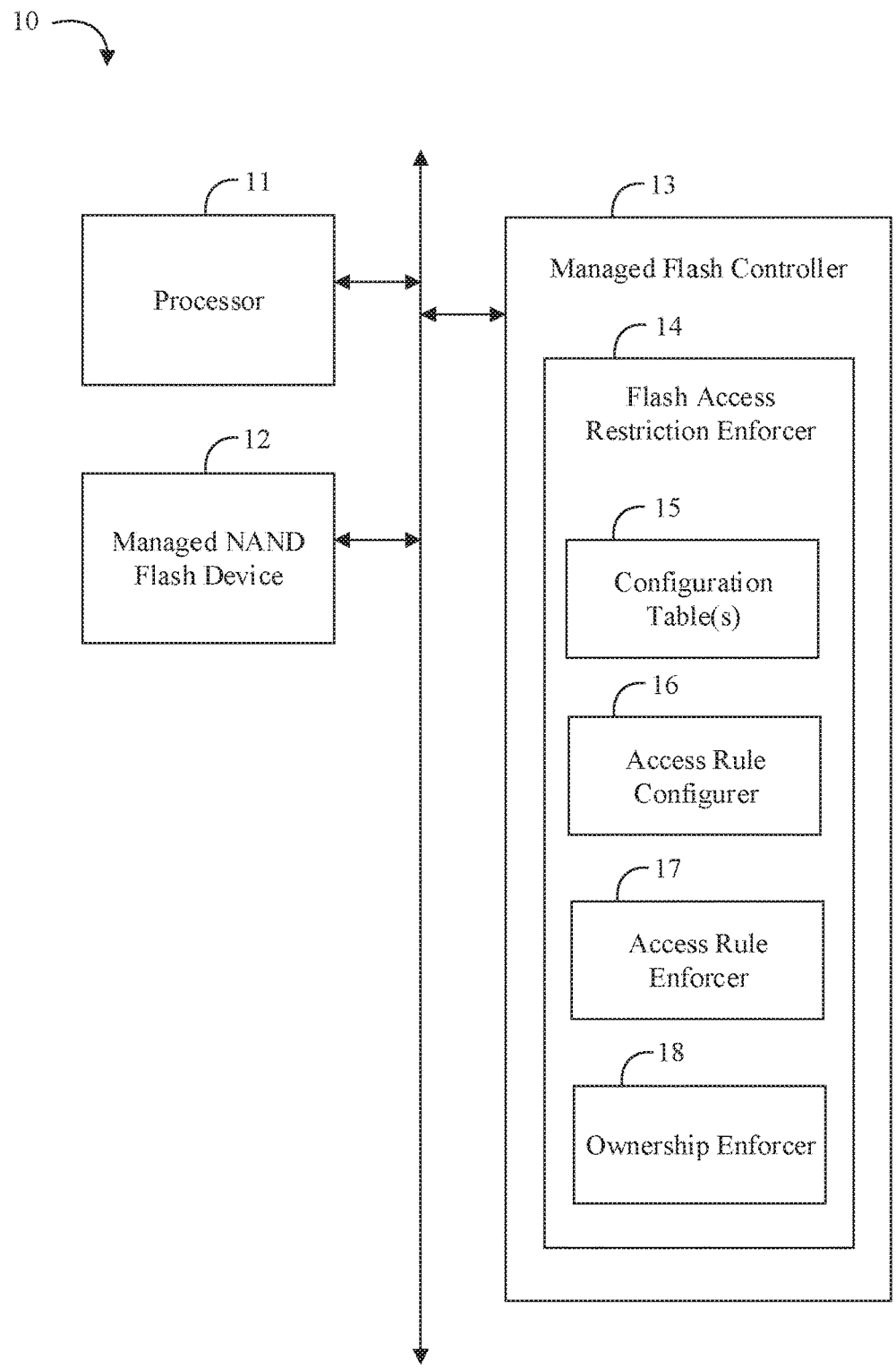
FIG. 1 is a block diagram of an example of an electronic processing system according to an embodiment.

Turning now to FIG. 1, an embodiment of an electronic processing system 10 may include a processor 11, a managed NAND flash device 12, and a managed flash controller 13 communicatively coupled between the processor 11 and the managed NAND flash device 12. The managed flash controller 13 may include a flash access restriction enforcer 14 to enforce access controls on read and write transactions to the managed NAND flash device 12. For example, the flash access restriction enforcer 14 may include one or more configuration tables 15 to store access control rules.

In some embodiments of the system 10, the flash access restriction enforcer 14 may also include an access rule configurer 16 to configure access control restrictions in the one or more configuration tables 15. For example, the access rule configurer 16 may be configured to define access control restrictions on one or more address ranges for the managed NAND flash device 12. In some embodiments, the flash access restriction enforcer 14 may include an access rule enforcer 17 to enforce an access control rule stored in the one or more configuration tables 15. In any of the embodiments described herein, the flash access restriction enforcer 14 may also include an ownership enforcer 18 to enforce an ownership of an access transaction with the managed NAND flash device 12.

Embodiments of each of the above processor 11, managed NAND flash device 12, managed flash controller 13, flash access restriction enforcer 14, configuration tables 15, access rule configurer 16, access rule enforcer 17, ownership enforcer 18, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the managed NAND flash device 12, other persistent storage media, or other system memory may store a set of instructions which when executed by the processor 11 cause the system 10 to implement one or more components, features, or aspects of the system 10 (e.g., the managed flash controller 13, the flash access restriction enforcer 14, the configuration tables 15, the access rule configurer 16, the access rule enforcer 17, the ownership enforcer 18, etc.).

Figure 2:
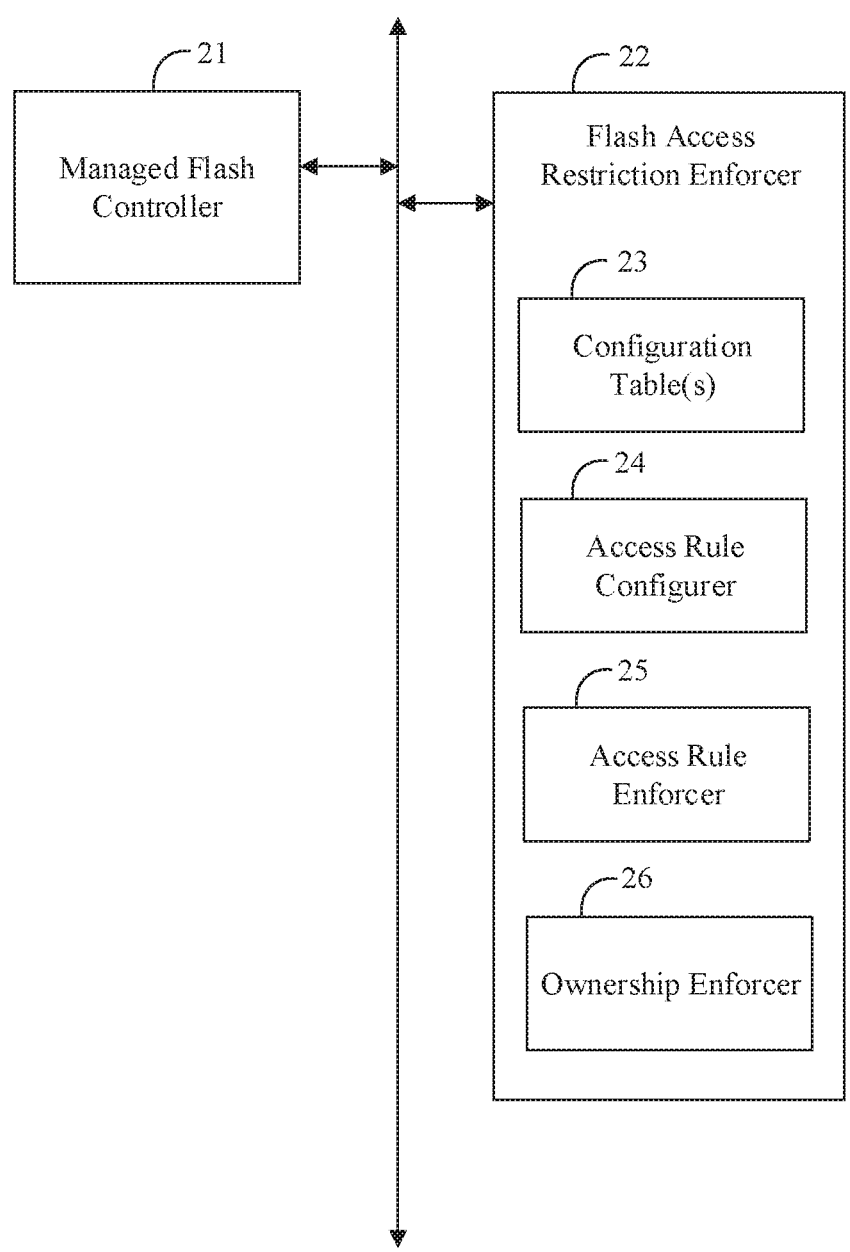
FIG. 2 is a block diagram of an example of memory apparatus according to an embodiment.

Turning now to FIG. 2, an embodiment of a memory apparatus 20 may include a managed flash controller 21 to control a managed flash device, and a flash access restriction enforcer 22 communicatively coupled to the managed flash controller 21 to enforce access controls on read and write transactions to the managed flash device. For example, the flash access restriction enforcer 22 may include one or more configuration tables 23 to store access control rules. In some embodiments, the flash access restriction enforcer 22 may include an access rule configurer 24 to configure access control restrictions in the one or more configuration tables 23. For example, the access rule configurer 24 may be configured to define access control restrictions on one or more address ranges for the managed flash device. In some embodiments, the flash access restriction enforcer 22 may include an access rule enforcer 25 to enforce an access control rule stored in the one or more configuration tables 23. The flash access restriction enforcer 22 may also include an ownership enforcer 26 to enforce an ownership of an access transaction with the managed flash device.

Embodiments of each of the above managed flash controller 21, flash access restriction enforcer 22, configuration tables 23, access rule configurer 24, access rule enforcer 25, ownership enforcer 26, and other components of the apparatus 20 may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
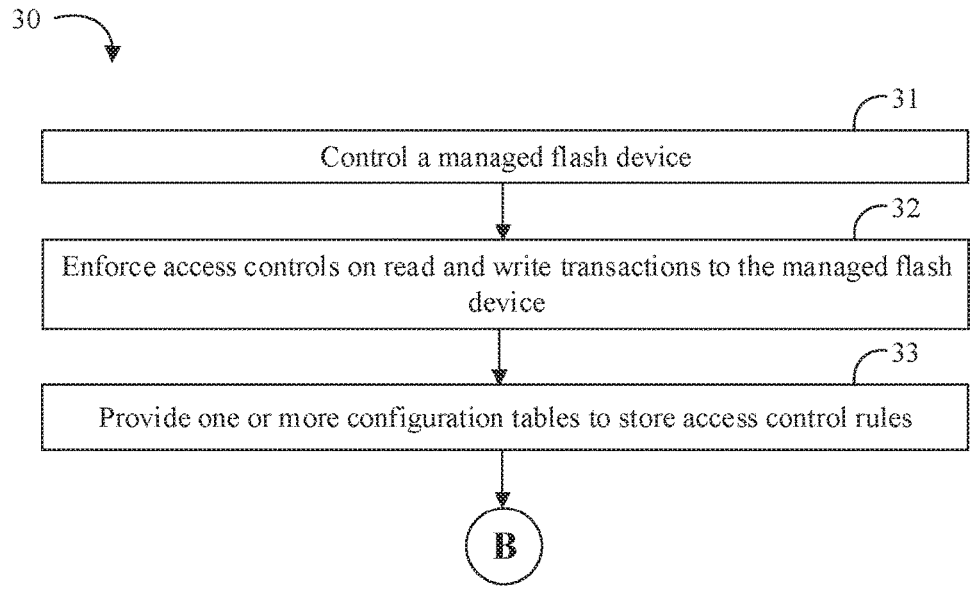
FIGS. 3A to 3B are flowcharts of an example of a method of controlling memory according to an embodiment.
Figure 3B:
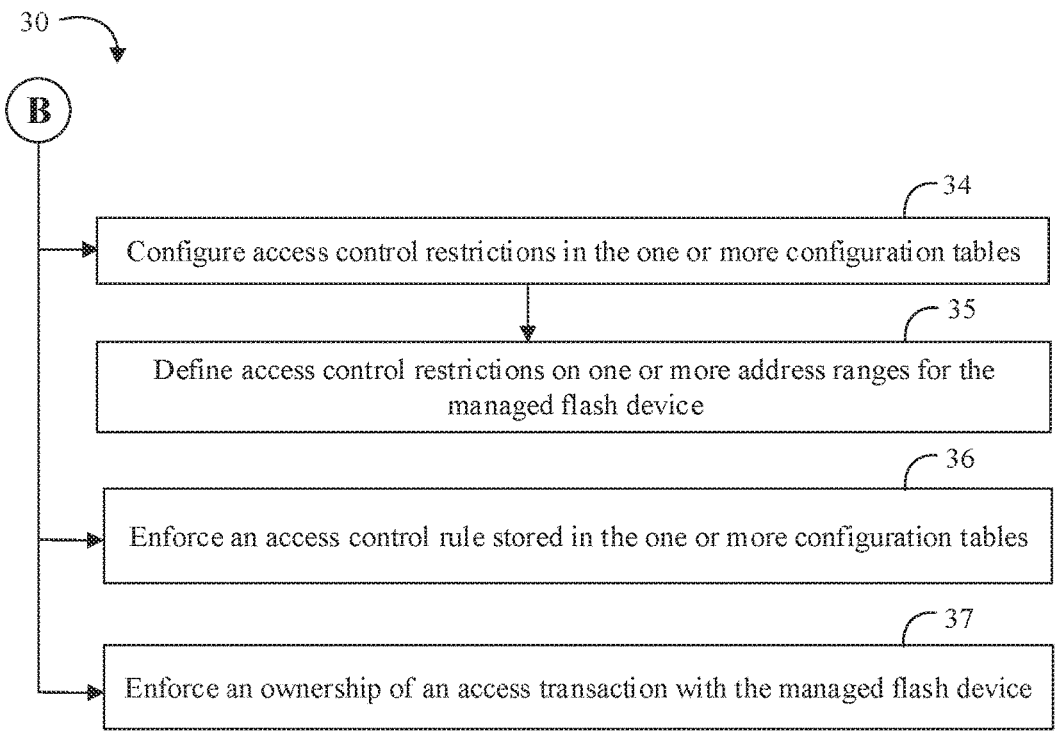

Turning now to FIGS. 3A to 3B, an embodiment of a method 30 of controlling memory may include controlling a managed flash device at block 31, and enforcing access controls on read and write transactions to the managed flash device at block 32. The method 30 may also include providing one or more configuration tables to store access control rules at block 33. In some embodiments, the method 30 may further include configuring access control restrictions in the one or more configuration tables at block 34. For example, the method 30 may include defining access control restrictions on one or more address ranges for the managed flash device at block 35. Some embodiments of the method 30 may further include enforcing an access control rule stored in the one or more configuration tables at block 36, and/or enforcing an ownership of an access transaction with the managed flash device at block 37.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 30 may be implemented on a computer readable medium as described in connection with Examples 19 to 24 below. For example, embodiments or portions of the method 30 may be implemented in applications (e.g., through an application programming interface (API)) or driver software running on an operating system (OS).

Advantageously, some embodiments may augment managed flash (e.g., eMMC/UFS) host controllers to perform fine-grained access controls. Some systems may use serial flash for storing system firmware such as basic input output system (BIOS) and/or runtime firmware for various programmable engines. Serial flash may include a small, low-power flash memory that uses a serial interface, typically Serial Peripheral Interface Bus (SPI), for sequential data access. Other systems, particularly mobile devices and/or consumer electronics, may use managed flash devices such as eMMC or UFS storage media. In some platforms, the SPI flash controller may include several access control features that allow restricting access to parts of the SPI flash to a well-defined set of initiators. However, conventional eMMC/UFS controllers provide limited access control features and may require complicated workarounds to achieve a secure usage models.

Some embodiments may advantageously provide fine-grained read/write access controls for managed flash devices. For example, some embodiments may augment the eMMC/UFS standards and/or off-the-shelf eMMC/UFS controllers with additional access control features for managed NAND flash devices. Advantageously, some embodiments may support consistent secure usages across various segments (e.g., system-on-chip (SoC), client personal computers (PCs), mobile, internet-of-things (IoT), etc.) even if the platform utilizes managed flash (e.g., eMMC/UFS compatible devices) for its storage.

MMC and UFS may each include a serial interface. The electrical interface for UFS may use the M-PHY developed by the MOBILE INDUSTRY PROCESOR INTERFACE (MIPI) ALLIANCE, which may include a high speed serial interface targeting 2.9 Gbit/s per lane with up-scalability to 5.8 Gbit/s per lane. The eMMC standard may support a limited feature set where 1) flash partitions are left unprotected; 2) partitions can be write-protected at platform manufacturing; or 3) partitions can be write-protected by early firmware at every boot. A problem with this arrangement is that after the partition is write-protected, no entity (e.g., not even trusted entities) can write to it. This poses a problem for many usage models where trusted entities may need to be able to update some data on flash at runtime. For example, unified extensible firmware interface (UEFI) runtime variables may need to be writeable at platform runtime but the write may need to be restricted to system management mode (SMM) code. Another problem may be that the eMMC/UFS standard may not support read protection for any partition. This implies that any data stored on flash is accessible to all host software, which is not always desirable. Advantageously, some embodiments may address both these limitations and provide fine-grained read and write access control checks for eMMC/UFS flash access. For example, some embodiments may provide read protection of certain parts of flash from unauthorized software agents. Advantageously, such read protection may enable new use models where software/firmware may write confidential data to a protected flash area (e.g., without first having to encrypt the confidential data, thus saving bandwidth).

Figure 4:
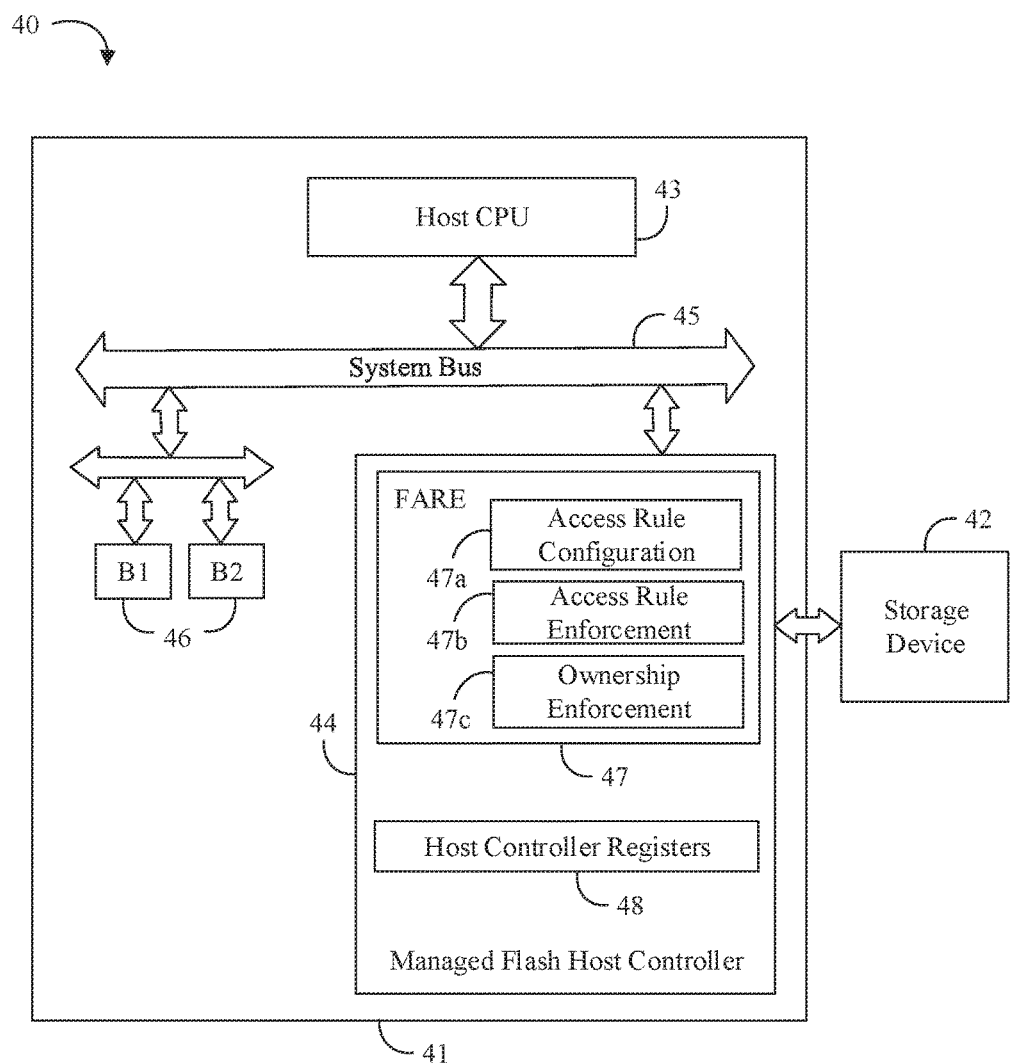
FIG. 4 is a block diagram of an example of a platform according to an embodiment.

Turning now to FIG. 4, a platform 40 may include a host portion 41 communicatively coupled to a storage device 42. The interface to the storage device 42 may include a serial interface or, in some embodiments, a parallel interface. For example, the platform 40 may include an SoC device and the storage device 42 may include a managed flash device having a serial interface (e.g., an eMMC or UFS compatible managed NAND flash device). The storage device 42 may be an embedded or otherwise installed component (e.g., not a removable storage device). The host portion 41 may include a host central processor unit (CPU) 43 communicatively coupled to a managed flash host controller 44 over a system bus 45. In some embodiments, the managed flash host controller 44 may be configured to control eMMC and/or UFS compatible storage media. One or more functional blocks 46 (e.g., block B1, block B2, etc.) may also be communicatively coupled to the managed flash host controller 44 over the system bus 45. The managed flash host controller 44 may be physically and/or logically positioned between the storage device 42 and the host CPU 43 (e.g., and also between the storage device 42 and the functional blocks 46) to control access to the storage device 42.

The managed flash host controller 44 may advantageously include a flash access restriction enforcer (FARE) 47 to enforce runtime access controls on all transactions that attempt to read or write the storage device 42. The managed flash host controller 44 may also include host controller registers 48 that may store one or more configurable tables (e.g., that may be programmed at boot time or by a secure entity at runtime to allow for an extended set of access control rules). As will be described in more detail below, the FARE 47 may include one or more of an access rule configuration (ARC) unit 47a that may provide the description of access controls that need to be enforced, an access rule enforcement (ARE) unit 47b to enforce the rules programmed by the ARC unit 47a, and/or an ownership enforcement (OE) unit 47c to ensure that an initiating entity in the platform 40 may create a session during which the initiating entity owns all of the host controller registers 48 and no other entity can read or write them during the session.

In some embodiments, the ARC unit 47a may contain or access a set of configurable tables that may define access control restrictions on various address ranges within the storage device 42. For example, the ARC unit 47a may describe a protection rule where certain address ranges in an eMMC user partition are writeable by SMM code only. For example, the configurable tables may be implemented using the host controller registers 48, other registers, SRAM, etc. In some embodiments, the ARC tables themselves may be access protected. The platform 40 may provide security features in an on-chip interconnect fabric. For example, if the ARC unit 47a is connected to an INTEL ON-CHIP SYSTEM FABRIC (IOSF) primary fabric, it may use the security attributes of initiator (SAI) in the incoming transaction to determine if the transaction should be allowed to access its tables. Other platforms may provide an ADVANCED MICROCONTROLLER BUS ARCHITECTURE (AMBA) interconnect fabric. There may be other fabric or system-specific techniques to reliably determine the transaction initiator. The ARC tables may be preserved across power transitions if they will not be reprogrammed on resume from the low power state by an authorized entity. In some embodiments, the ARC tables may be programmed by BIOS and then updated at runtime by a secure microcontroller, as needed.

In some embodiments, the ARE unit 47b may be responsible to ensure that any read/write transactions intended towards the storage device 42 obey the rules programmed in the ARC unit 47a (e.g., or ARC tables). The ARE unit 47b may be implemented as fixed-function logic or as a microcontroller with firmware that performs the required checking. For example, programming of a block storage device like an eMMC/UFS device may involve complicated protocols and/or multi-level data structures that may need to be parsed by the ARE unit 47b to infer the storage address targeted by a read or write command. The ARE unit 47b may also include DMA capability to check data structures like scatter/gather lists stored in system memory. If implemented as a microcontroller with firmware, the ARE unit 47b may support a boot ROM and authenticated firmware updates to ensure the integrity of checking algorithms. In some embodiments, the ARE unit 47b may make the final determination on whether a transaction is allowed or dropped based on the access control rules.

In some embodiments, the OE unit 47c may ensure that when a read/write transaction from a legitimate initiator is authorized by the ARE unit 47b, the transaction may proceed to completion without being influenced by any other initiator. For example, while a transaction initiated by SMM code is updating some UEFI variable in the storage device 42, no other initiator on the platform 40 should be able to write to the host controller registers 48 with the intent of corrupting or dropping the SMM transaction. In some embodiments, the SMM code may create a session with the managed flash host controller 44 (e.g., via the OE unit 47c) and may be guaranteed that no other initiator can modify the host controller registers 48 during the created session.

Figure 5:
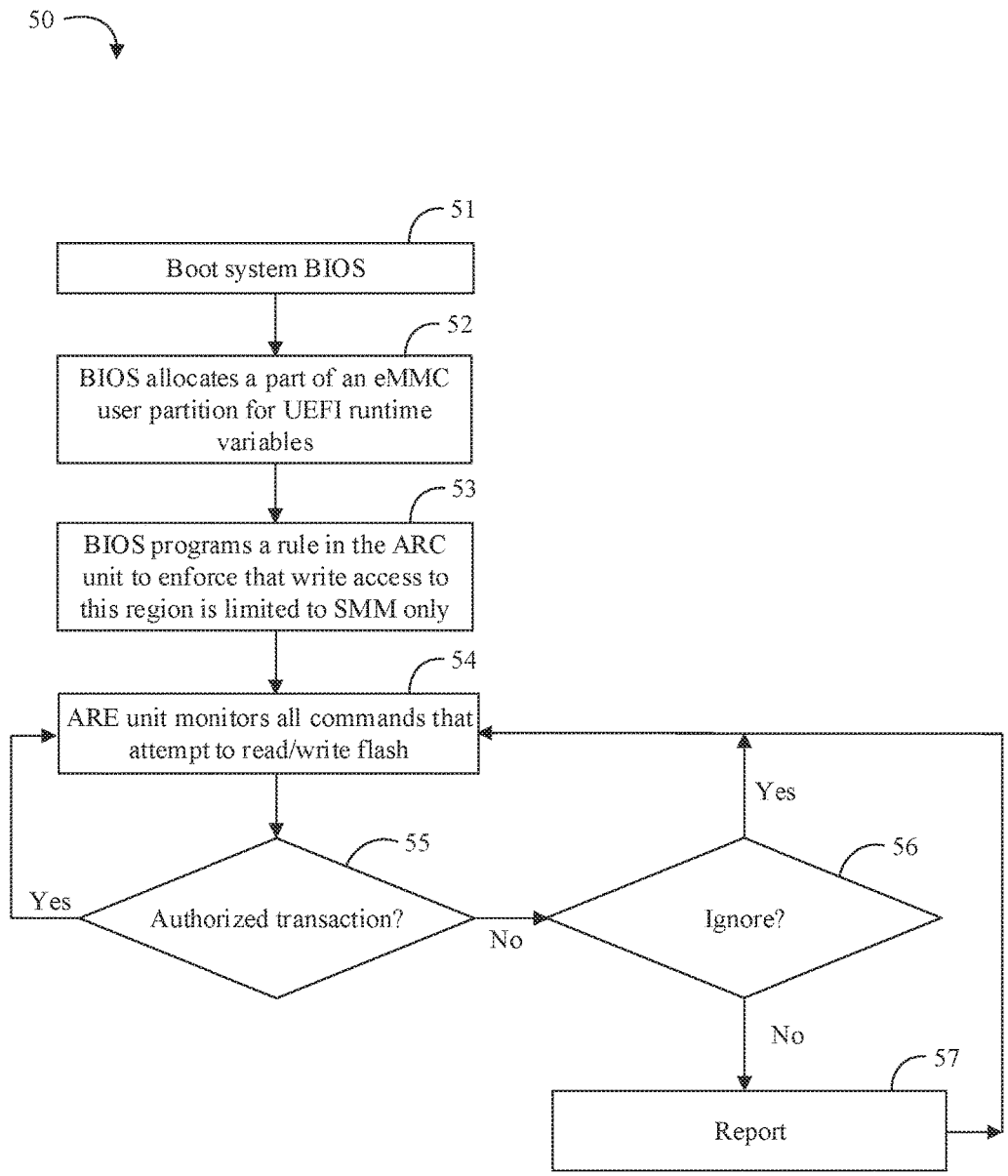
FIG. 5 is a flowchart of another example of controlling memory according to an embodiment.

Turning now to FIG. 5, some embodiments may advantageously enable a variety of usage models that may benefit from fine-grained access control on system non-volatile storage. For example, an embodiment of a method 50 of controlling memory may include a system BIOS booting up at block 51, and the system BIOS allocating a part of an eMMC user partition for UEFI runtime variables at block 52. The BIOS may then program a rule in the ARC unit to enforce that write access to this region is limited to SMI only at block 53. At runtime, the ARE unit may monitor all commands that attempt to read/write flash at block 54, and may enforce the above rule. For example, if the ARE unit detects an unauthorized transaction at block 55, the ARE unit may determine whether to drop an unauthorized transaction silently at block 56, or report an unauthorized transaction to a trusted entity in the system at block 57.

Figure 6:
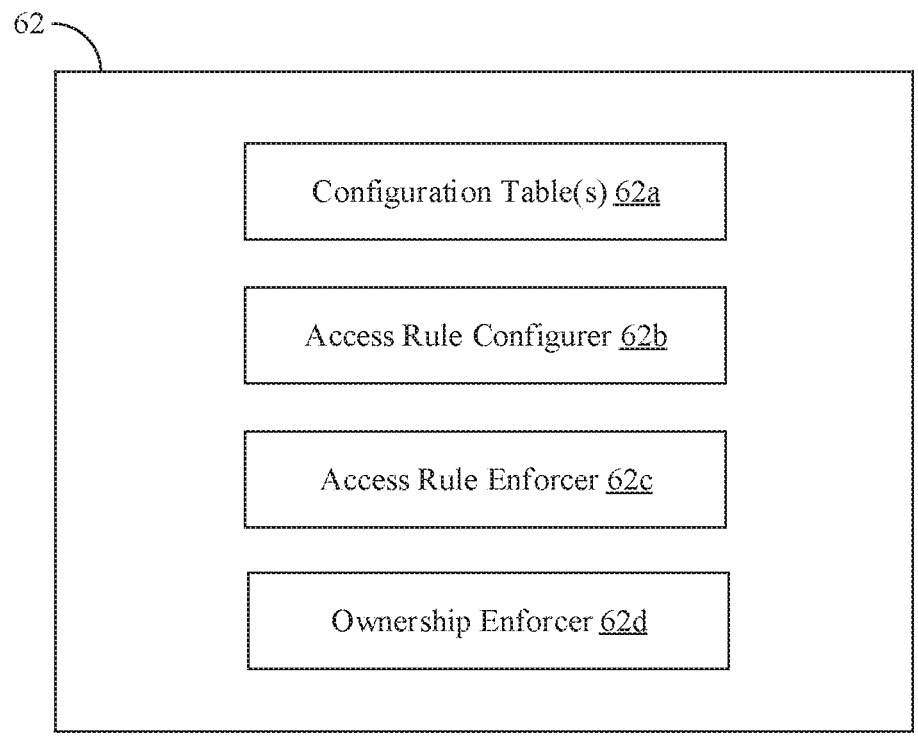
FIGS. 6 and 7 are block diagrams of examples of memory apparatuses according to embodiments.

FIG. 6 shows a FARE apparatus 62 (62a-62d) that may implement one or more aspects of the method 30 (FIGS. 3A to 3B) and/or the method 50 (FIG. 5). The FARE apparatus 62, which may include logic instructions, configurable logic, fixed-functionality hardware logic, etc., may be readily substituted for the FAREs already discussed (e.g., FARE 14 in FIG. 1, FARE 22 in FIG. 2, FARE 47 in FIG. 4). One or more configuration tables 62a may store access control rules. An access rule configurer 62b may configure access control restrictions in the one or more configuration tables 62a. For example, the access rule configurer 62b may be configured is further to define access control restrictions on one or more address ranges for a managed flash device. An access rule enforcer 62c may enforce an access control rule stored in the one or more configuration tables 62a. An ownership enforcer 62d may enforce an ownership of an access transaction with the managed flash device.

Figure 7:
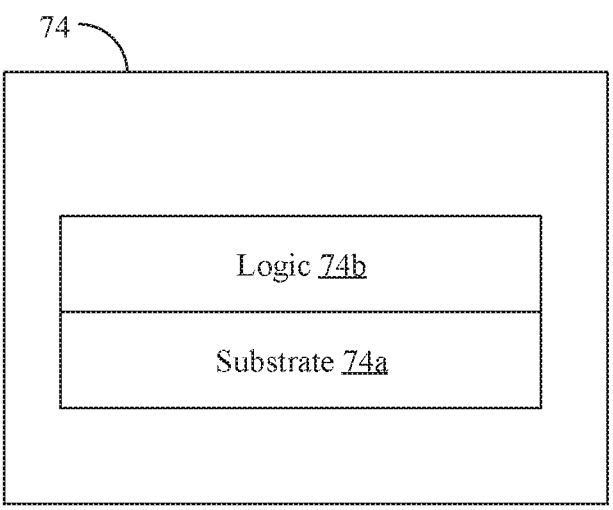

Turning now to FIG. 7, a FARE apparatus 74 (74a, 74b) is shown in which logic 74b (e.g., transistor array and other integrated circuit/IC components) is coupled to a substrate 74a (e.g., silicon, sapphire, gallium arsenide, etc.). The logic 74b may generally implement one or more aspects of the method 30 (FIGS. 3A to 3B) and/or the method 50 (FIG. 5). Thus, the logic 74b may control a managed flash device, and enforce access controls on read and write transactions to the managed flash device. The logic 74b may also provide one or more configuration tables to store access control rules, and configure access control restrictions in the one or more configuration tables. In some embodiments, the logic 74b may also be configured to define access control restrictions on one or more address ranges for the managed flash device. The logic 74b may also be configured to enforce an access control rule stored in the one or more configuration tables, and/or to enforce an ownership of an access transaction with the managed flash device.

ADDITIONAL NOTES AND EXAMPLES

Example 1 may include an electronic processing system, comprising a processor, a managed NAND flash device, and a managed flash controller communicatively coupled between the processor and the managed NAND flash device, wherein the managed flash controller includes a flash access restriction enforcer to enforce access controls on read and write transactions to the managed NAND flash device.

Example 2 may include the system of Example 1, wherein the flash access restriction enforcer comprises one or more configuration tables to store access control rules.

Example 3 may include the system of Example 2, wherein the flash access restriction enforcer comprises an access rule configurer to configure access control restrictions in the one or more configuration tables.

Example 4 may include the system of Example 3, wherein the access rule configurer is further to define access control restrictions on one or more address ranges for the managed NAND flash device.

Example 5 may include the system of Example 2, wherein the flash access restriction enforcer comprises an access rule enforcer to enforce an access control rule stored in the one or more configuration tables.

Example 6 may include the system of any of Examples 1 to 5, wherein the flash access restriction enforcer comprises an ownership enforcer to enforce an ownership of an access transaction with the managed NAND flash device.

Example 7 may include a memory apparatus, comprising a managed flash controller to control a managed flash device, and a flash access restriction enforcer communicatively coupled to the managed flash controller to enforce access controls on read and write transactions to the managed flash device.

Example 8 may include the apparatus of Example 7, wherein the flash access restriction enforcer comprises one or more configuration tables to store access control rules.

Example 9 may include the apparatus of Example 8, wherein the flash access restriction enforcer comprises an access rule configurer to configure access control restrictions in the one or more configuration tables.

Example 10 may include the apparatus of Example 9, wherein the access rule configurer is further to define access control restrictions on one or more address ranges for the managed flash device.

Example 11 may include the apparatus of Example 8, wherein the flash access restriction enforcer comprises an access rule enforcer to enforce an access control rule stored in the one or more configuration tables.

Example 12 may include the apparatus of any of Examples 7 to 11, wherein the flash access restriction enforcer comprises an ownership enforcer to enforce an ownership of an access transaction with the managed flash device.

Example 13 may include a method of controlling memory, comprising controlling a managed flash device, and enforcing access controls on read and write transactions to the managed flash device.

Example 14 may include the method of Example 13, further comprising providing one or more configuration tables to store access control rules.

Example 15 may include the method of Example 14, further comprising configuring access control restrictions in the one or more configuration tables.

Example 16 may include the method of Example 15, further comprising defining access control restrictions on one or more address ranges for the managed flash device.

Example 17 may include the method of Example 14, further comprising enforcing an access control rule stored in the one or more configuration tables.

Example 18 may include the method of any of Examples 13 to 17, further comprising enforcing an ownership of an access transaction with the managed flash device.

Example 19 may include at least one computer readable medium, comprising a set of instructions, which when executed by a computing device, cause the computing device to control a managed flash device, and enforce access controls on read and write transactions to the managed flash device.

Example 20 may include the at least one computer readable medium of Example 19, comprising a further set of instructions, which when executed by a computing device, cause the computing device to provide one or more configuration tables to store access control rules.

Example 21 may include the at least one computer readable medium of Example 20, comprising a further set of instructions, which when executed by a computing device, cause the computing device to configure access control restrictions in the one or more configuration tables.

Example 22 may include the at least one computer readable medium of Example 21, comprising a further set of instructions, which when executed by a computing device, cause the computing device to define access control restrictions on one or more address ranges for the managed flash device.

Example 23 may include the at least one computer readable medium of Example 20, comprising a further set of instructions, which when executed by a computing device, cause the computing device to enforce an access control rule stored in the one or more configuration tables.

Example 24 may include the at least one computer readable medium of any of Examples 19 to 23, comprising a further set of instructions, which when executed by a computing device, cause the computing device to enforce an ownership of an access transaction with the managed flash device.

Example 25 may include a memory apparatus, comprising means for controlling a managed flash device, and means for enforcing access controls on read and write transactions to the managed flash device.

Example 26 may include the apparatus of Example 25, further comprising means for providing one or more configuration tables to store access control rules.

Example 27 may include the apparatus of Example 26, further comprising means for configuring access control restrictions in the one or more configuration tables.

Example 28 may include the apparatus of Example 27, further comprising means for defining access control restrictions on one or more address ranges for the managed flash device.

Example 29 may include the apparatus of Example 26, further comprising means for enforcing an access control rule stored in the one or more configuration tables.

Example 30 may include the apparatus of any of Examples 25 to 29, further comprising means for enforcing an ownership of an access transaction with the managed flash device.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
   a processor;
   a managed flash device pre-configured to include a first partition that is not read-protected to allow reads by any entity from the first partition and a second partition that is write-protected to disallow writes by any entity to the second partition; and
   a managed flash controller communicatively coupled between the processor and the managed flash device, wherein the managed flash controller includes:
      a flash access restriction enforcer to disallow a read by an unauthorized entity from the first partition and allow a write by an authorized entity to the second partition.

2. The system of claim 1, wherein the flash access restriction enforcer comprises:
   one or more configuration tables to store access control rules.

3. The system of claim 2, wherein the flash access restriction enforcer comprises:
   an access rule configurer to configure access control restrictions in the one or more configuration tables.

4. The system of claim 3, wherein the access rule configurer is further to define access control restrictions on one or more address ranges for the managed flash device to allow the write only by a system management mode entity to an address range of the second partition.

5. The system of claim 2, wherein the flash access restriction enforcer comprises:
an access rule enforcer to enforce an access control rule stored in the one or more configuration tables to allow the write by a system management mode entity to the second partition.

6. The system of claim 1, wherein the flash access restriction enforcer comprises:
an ownership enforcer to enforce an ownership of an access transaction with the managed flash device to lock access during the write, only for the authorized entity, to a configuration table that is to store an access control rule.

7. A memory apparatus, comprising:
a managed flash controller to control a managed flash device pre-configured to include a first partition that is not read-protected to allow reads by any entity from the first partition and a second partition that is write-protected to disallow writes by any entity to the second partition; and
a flash access restriction enforcer communicatively coupled to the managed flash controller to disallow a read by an unauthorized entity from the first partition and to allow a write by an authorized entity to the second partition.

8. The apparatus of claim 7, wherein the flash access restriction enforcer comprises:
one or more configuration tables to store access control rules.

9. The apparatus of claim 8, wherein the flash access restriction enforcer comprises:
an access rule configurer to configure access control restrictions in the one or more configuration tables.

10. The apparatus of claim 9, wherein the access rule configurer is further to define access control restrictions on one or more address ranges for the managed flash device to allow the write only by a system management mode entity to an address range of the second partition.

11. The apparatus of claim 8, wherein the flash access restriction enforcer comprises:
an access rule enforcer to enforce an access control rule stored in the one or more configuration tables to allow the write by a system management mode entity to the second partition.

12. The apparatus of claim 7, wherein the flash access restriction enforcer comprises:
an ownership enforcer to enforce an ownership of an access transaction with the managed flash device to lock access during the write, only for the authorized entity, to a configuration table that is to store an access control rule.

13. A method of controlling memory, comprising:
controlling a managed flash device pre-configured to include a first partition that is not read-protected to allow reads by any entity from the first partition and a second partition that is write-protected to disallow writes by any entity to the second partition; and
disallowing a read by an unauthorized entity from the first partition and allowing a write by an authorized entity to the second partition.

14. The method of claim 13, further comprising:
providing one or more configuration tables to store access control rules.

15. The method of claim 14, further comprising:
configuring access control restrictions in the one or more configuration tables.

16. The method of claim 15, further comprising:
defining access control restrictions on one or more address ranges for the managed flash device to allow the write only by a system management mode entity to an address range of the second partition.

17. The method of claim 14, further comprising:
enforcing an access control rule stored in the one or more configuration tables to allow the write by a system management mode entity to the second partition.

18. The method of claim 13, further comprising:
enforcing an ownership of an access transaction with the managed flash device to lock access during the write, only for the authorized entity, to a configuration table that is to store an access control rule.

19. At least one computer readable medium, comprising a set of instructions, which when executed by a computing device, cause the computing device to:
control a managed flash device pre-configured to include a first partition that is not read-protected to allow reads by any entity from the first partition and a second partition that is write-protected to disallow writes by any entity to the second partition; and
disallow a read by an unauthorized entity from the first partition and allow a write by an authorized entity to the second partition.

20. The at least one computer readable medium of claim 19, comprising a further set of instructions, which when executed by a computing device, cause the computing device to:
provide one or more configuration tables to store access control rules.

21. The at least one computer readable medium of claim 20, comprising a further set of instructions, which when executed by a computing device, cause the computing device to:
configure access control restrictions in the one or more configuration tables.

22. The at least one computer readable medium of claim 21, comprising a further set of instructions, which when executed by a computing device, cause the computing device to:
define access control restrictions on one or more address ranges for the managed flash device to allow the write only by a system management mode entity to an address range of the second partition.

23. The at least one computer readable medium of claim 20, comprising a further set of instructions, which when executed by a computing device, cause the computing device to:
enforce an access control rule stored in the one or more configuration tables to allow the write by a system management mode entity to the second partition.

24. The at least one computer readable medium of claim 19, comprising a further set of instructions, which when executed by a computing device, cause the computing device to:
enforce an ownership of an access transaction with the managed flash device to lock access during the write, only for the authorized entity, to a configuration table that is to store an access control rule.

* * * * *